United States Patent
Parolkar et al.

(10) Patent No.: US 8,271,045 B2
(45) Date of Patent: Sep. 18, 2012

(54) METHODS AND APPARATUS TO DISPLAY SERVICE QUALITY TO A USER OF A MULTIPLE MODE COMMUNICATION DEVICE

(75) Inventors: Satish Parolkar, Austin, TX (US); Anil Doradla, Austin, TX (US)

(73) Assignee: AT&T Intellectual Property, I, L.P, Atlanta, GA (US)

( * ) Notice: Subject to any disclaimer, the term of this patent is extended or adjusted under 35 U.S.C. 154(b) by 1172 days.

(21) Appl. No.: 11/669,710

(22) Filed: Jan. 31, 2007

(65) Prior Publication Data
US 2008/0181211 A1   Jul. 31, 2008

Related U.S. Application Data

(63) Continuation-in-part of application No. 11/531,356, filed on Sep. 13, 2006, now Pat. No. 7,929,453.

(51) Int. Cl.
*H04M 1/00* (2006.01)

(52) U.S. Cl. .............. 455/566; 455/552.1; 455/448; 455/435.2; 455/132; 455/133

(58) Field of Classification Search ........... 455/566, 455/552.1, 448, 435.2, 132–134
See application file for complete search history.

(56) References Cited

U.S. PATENT DOCUMENTS

| | | | |
|---|---|---|---|
| 6,826,194 | B1 | 11/2004 | Vered et al. |
| 2001/0043577 | A1 | 11/2001 | Barany et al. |
| 2003/0074443 | A1 | 4/2003 | Melaku et al. |
| 2004/0085898 | A1 | 5/2004 | Gass |
| 2005/0226193 | A1 | 10/2005 | Karhiniemi et al. |
| 2005/0238026 | A1 | 10/2005 | Wu et al. |
| 2005/0286486 | A1 | 12/2005 | Miller |
| 2006/0020697 | A1 * | 1/2006 | Kelso et al. ............ 709/224 |
| 2006/0031469 | A1 | 2/2006 | Clarke et al. |
| 2006/0067308 | A1 * | 3/2006 | Cho ............ 370/352 |
| 2006/0077949 | A1 | 4/2006 | Allen et al. |
| 2006/0246900 | A1 * | 11/2006 | Zheng ............ 455/435.3 |

FOREIGN PATENT DOCUMENTS

| | | |
|---|---|---|
| EP | 1 670 161 A2 | 6/2006 |
| JP | 9-205427 A | 8/1997 |
| JP | 2004-153812 A | 5/2004 |

* cited by examiner

*Primary Examiner* — Kamran Afshar
*Assistant Examiner* — Dung Lam
(74) *Attorney, Agent, or Firm* — Hanley, Flight & Zimmerman, LLC (57) ABSTRACT

Methods and apparatus that relate to the display of network availability and quality of service (QoS) to a user of a multiple mode communication device are disclosed. An example method, obtains a quality of service QoS metric for a call routed through a first communication provider to a second communication provider, wherein the QoS metric represents a service quality provided by the first communication provider. Further, the representation of the QoS metric for the first communication provider is provided to a user. Additionally, the user can select a mode of communication for a communication device once the QoS metric has been established.

23 Claims, 6 Drawing Sheets

FIG. 6

METHODS AND APPARATUS TO DISPLAY SERVICE QUALITY TO A USER OF A MULTIPLE MODE COMMUNICATION DEVICE

RELATED APPLICATIONS

This patent is a continuation-in-part of U.S. Ser. No. 11/531,356, entitled "METHOD AND APPARATUS FOR PRESENTING QUALITY INFORMATION IN A COMMUNICATION SYSTEM", filed on Sep. 13, 2006 now U.S. Pat. No. 7,929,453. U.S. Ser. No. 11/531,356 is hereby incorporated by reference in its entirety.

FIELD OF THE DISCLOSURE

This disclosure relates generally to communication networks and, more particularly, to methods and apparatus that relate to network availability and quality of service (QoS) on a device configured to support multiple modes.

BACKGROUND

Analog telephone networks use circuit-switched networks designed to provide voice communications. One characteristic of a circuit-switched network is that they are connection-oriented, wherein a hard-wired information path must exist before information will transmit. Further, circuit-switched networks reserve the full bandwidth of the information over the duration of the transmission. As a result, the transmission has a guaranteed QoS on the network, because the telephone call does not share its dedicated circuit with other telephone calls. This dedicated circuit insures high voice quality, continuous information transmission, and minimum delay.

Unlike analog telephone networks, which are designed to serve the needs of voice communications, data networks, such as the Internet, are used to facilitate data communications. Voice over Internet Protocol (VoIP) is a method in which voice communication may be carried out over data networks, such as the Internet, by processing voice into Internet Protocol (IP)-formatted packets. VoIP transmits digital packets of encoded voice information over shared packet-based circuits. In contrast to analog circuit-switched networks that are designed for constant bit-rate circuit applications over a continuous transmission path, packet-switched networks are designed for variable bit-rate applications transmitted over a series of routers and paths.

Problems can occur when transmitting voice communication over a packet-switched network. For example, because there is no dedicated transmission path, large delays in transmission can occur as a result of the packet transfer between routers and different physical transmission paths. When a significant amount of data is transmitted over a packet-based circuit there may be a decrease the QoS due to bandwidth sharing that must occur to facilitate communication over a shared path. The decrease in QoS may manifest as delay, jitter, and/or distortion of the transmission. Such effects impact the audio quality of the system and, accordingly, the satisfaction of the users on a communication network.

Known methods of determining QoS for an end-to-end transmission between two callers enable a communication service provider to monitor the QoS characteristics of the communications between the two callers at the callers' physical premises. That is, hardware may be installed at consumer sites and calls between consumers may be monitored for quality. In one known method of determining QoS, an end-to-end transmission is defined over a single provider network or multiple provider networks. In either case, the QoS is determined from a transmitter to a receiver, or end-to-end transmission. Furthermore, these known methods do not facilitate monitoring QoS for a portion of a network facilitating a call when the call is routed over multiple providers' networks. Additionally, such QoS monitoring configurations mandate that a single entity has control of the consumer premises equipment (CPE) at all customers' sites between which the QoS is to be monitored.

DETAILED DESCRIPTION

Figure 1:
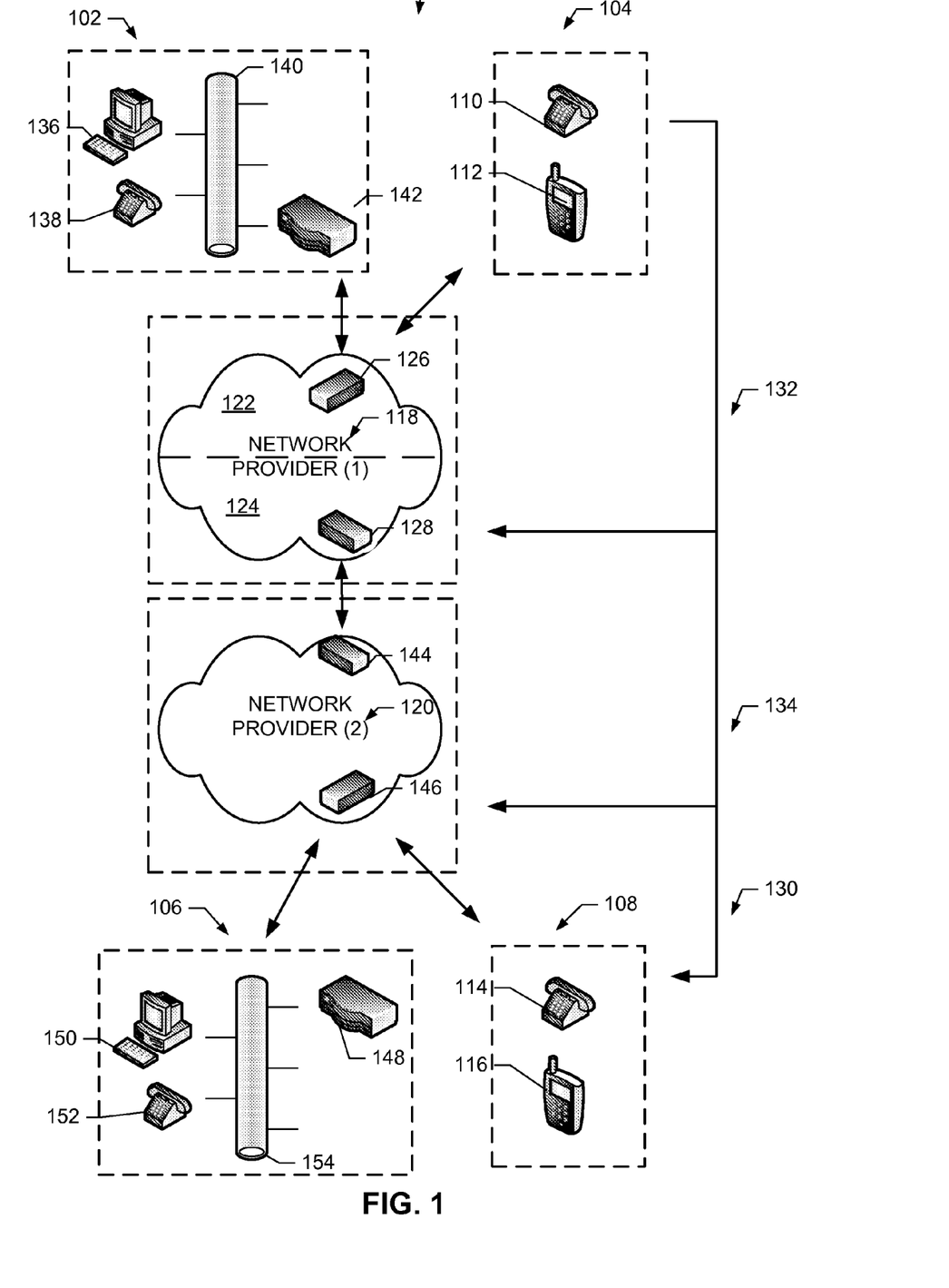
FIG. 1 is an example view of a communication network with multiple network environments and multiple service providers.

FIG. 1 depicts an example view of a communication network with multiple network environments and multiple service providers. The example communication network 100 contains various end points 102, 104, 106, and 108 for which a call can be established. As shown in FIG. 1, the end points 102 and 106 are depicted as VoIP communication connections, and the other endpoints 104 and 106 are depicted as a standard telephone 110 and 114 or cellular device 112 and 116. In FIG. 1, a wired or wireless device such as the end points 104 and 108 connected to a communication network 100 may comprise of any variety of devices such as, for instance a handheld, a handset, a personal digital assistant (PDA), etc. In the example communication network 100, the end points 102 and 106 may be any variety of VoIP devices such as, for instance, a VoIP phone, a computer, or some other device capable of transmitting a voice call using internet protocol (IP). The communication device can also be configured to allow any combination of modes (i.e., VoIP, Global System for Mobile communications (GSM), etc.), supported by a dual or multiple mode communication device.

Although the call may route though any number of network providers, in one example, the transmission will route through a first provider's communication network 118 and continue through to a second provider's communication network 120 and be received at one of the end points 106 or 108. The various end points 102, 104, 106, and 108 suggest the call may travel across a plurality of network environments (i.e., wire, wireless, VoIP, etc.). Additionally, the first provider's communication network 118 may comprise multiple network environments 122 and 124. For example, a call may transfer from a public switched telephone network (PSTN) to a wireless or cellular network or any other network contained within the first provider's communication network 118.

In an example shown in FIG. 1, a call initiating from an end point 102 routed through a first provider's communication network service provider 118, and continues on to a second provider's communication network 120 before reaching an end point 106 or 108. The call, may route through multiple network environments 122 and 124 within the first provider's communication network 118, as previously described. In one example, the determination of the network availability and QoS maybe limited only to the originating call, extending to an edge device or specifically a session boarder controller 126 or 128 of the first provider's communication network 118.

In an example, network availability will determine the probability of a call being accepted onto a provider's communication network. The measurement of the QoS will begin with the authorization of a device at the end point 102 and extend to the edge device 126 or 128 inside the first provider's communication network 118. In this case, the QoS 130 for a communication network 100 is not measured from transmitter to receiver or end point 102 to end point 106 or 108. Instead, the QoS 132 is measured from the end point 102 to a session boarder controller or edge device 126 or 128 within the first provider's communication network 118. Additionally, another QoS 134 metric can be established for the second provider's communication network 120. In this embodiment the device connected to the end point 102 initiating a call in the first provider's communication network 118 and continuing on to a second provider's communication network 120, will establish and display a network availability and QoS 132 for the first provider's communication network 118 when a call is routed across multiple network providers.

As shown in FIG. 1, an example VoIP transmission maybe initiated from the end point 102, with a computer 136, a VoIP phone 138, or some other device capable of transmitting a voice call using Internet Protocol (IP). The computer 136, VoIP phone 138 or such device is typically connected to a local-area network (LAN) 140 or a wide-area network (WAN). In either case, a router 142 links the individual user devices together, most often using an Ethernet LAN. In a broader definition, a router 142 is designed to provide connectivity to an outside network by connecting LANs 140 to WANs, such as the Internet.

For a call, established at an end point 102, to be routed to a WAN it must pass through a session boarder controller or edge device 126. The edge device 126 typically performs the functions of destination lookup, IP connection management, compression/digitization, IP packetization and transport, authorization, access, and accounting. It is possible for other types of equipment to perform the tasks of the edge device 126. However, in this example, the edge device 126 will accomplish all of the presented tasks. The edge device 126 receives the telephone number in the form of dual-tone multifrequency (DTMF) tones, as generated by the end point 102 connections during dialing. The phone number is significant in that the digits determine the routing or switching necessary in placing a call. In a PSTN network, a gateway receives the DTMF tones, indicating the destination of the desired call. However, on a data network, a destination phone number has to be converted to an associated IP address that is used to route the call within a data network.

When authorization of a call is established, the edge device 126 must make a connection to the end point 102 or 104, thereby allowing the information to transmit. In order for the information to be transferred from a first provider's communication network 118 to a second provider's communication network 120 the information must be converted into a form suitable for that network (i.e. PSTN to VoIP). In one example, the conversion of voice data from analog or standard pulse-code modulation (PCM) digital format to a low-bit-rate stream carried out by the edge device 126. After the edge device 126 converts the voice data, the voice data must be transmitted across the first provider's communication network 118 in a manner that mirrors the transport qualities of the circuit-switched PSTN. When the call is routed to the second provider's communication network 120, the transmission is received by another edge device 144. The destination edge device 144 or 146 links the transmission to a router 148 completing the transmission. The router 148 connects the VoIP device 150 or 152 on LAN 154 completing the call to the end user 106.

The devices foregoing are typical of ones used in most communication systems. The manner in which a device interacts and functions depend on the setup and maintenance of the network by the service provider. The systems and methods described herein will describe the transmission or end user's call, over a communication network, to monitor the network availability and QoS for a provider's communication network.

Figure 2:
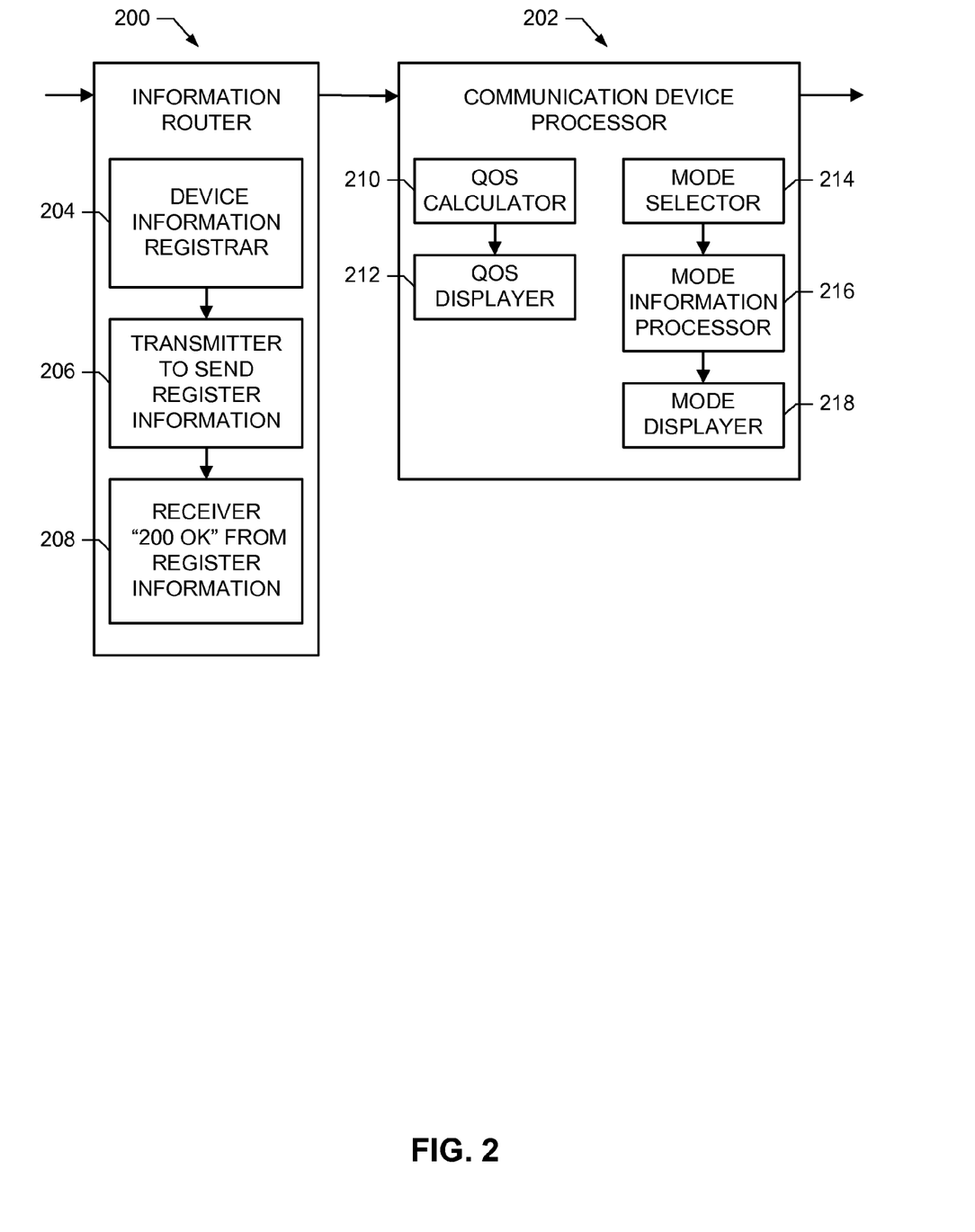
FIG. 2 is a block diagram depicting an example apparatus and method to generate and display the quality of service metric for a communication network.

FIG. 2 is a block diagram depicting an example apparatus and method to generate and display the quality of service metric for a communication network. The example of FIG. 2, determines the QoS for a call initiated by a VoIP network device extending through multiple network environments (e.g., wire, wireless, VoIP, etc.) and routed over multiple network service providers. The determination of a QoS metric for a user's network provider uses basic session initiation protocol (SIP) messages to establish the QoS metric for a communication network.

SIP provides signaling and call setup protocol for IP-based communications that can support a superset of the call processing functions. SIP enabled telephony networks can also implement many of the more advanced call processing features and is considered to be a peer-to-peer protocol. As such, it requires only a very simple and highly scalable core network with intelligence distributed to the network edge, embedded in endpoints or terminating devices built in either hardware or software. SIP features are implemented in the communicating endpoints (i.e., at the edge of the network). SIP makes use of network element to help route requests to the user's current location, authenticate and authorize users for services, implement provider call-routing policies, and provide features to users. These features exists as long as the session is active in other words, the session has not expired. The use of the SIP to send a register and "200 OK" response will equate to a QoS metric for a given time interval of expiration.

FIG. 2 depicts an information router 200 and a communication device processor 202. The information router 200 processes the information associated with a device connecting to a communication network. When a call is routed through to the first provider's communication network, the origin and authorization is determined. For a device to be established on a network, the IP address has to be authorized in the registrar 204. A transmitter sends the register message specifying the IP address of the device connecting to a communication network 206. The receiver verifies a "200 OK" message and returns the associated information to the device connecting to a communication network 208. This process is repeated for the duration of the authorized register session of the first provider's communication network. The "200 OK" response or data packet that is returned through the network path, is used to determine the QoS metric for a call routed through the first communication provider's network.

The communication device processor 202 receives the "200 OK" response or data packet that is returned through the network path and send the data to a QoS calculator 210 for processing. The QoS calculator 210 will determine network characteristics (i.e., bandwidth, time delay, etc.) from the received "200 OK" response message. The information associated with the QoS metric is further configured as a graphical icon by the QoS displayer 212. Once the QoS is displayed on the device, a mode selector 214 can change the mode of communication for the device based on the QoS metric. Any change in the mode selection is handled by a mode information processor 216. In addition, the mode information processor 216 accounts for any conflicting modes from incoming calls configured with another type of communication mode. Once the mode of the device has been changed by the mode information processor 216, the mode displayer 218 configures the device to output the communication mode for display on a screen, as shown in association with FIG. 4.

Figure 3:
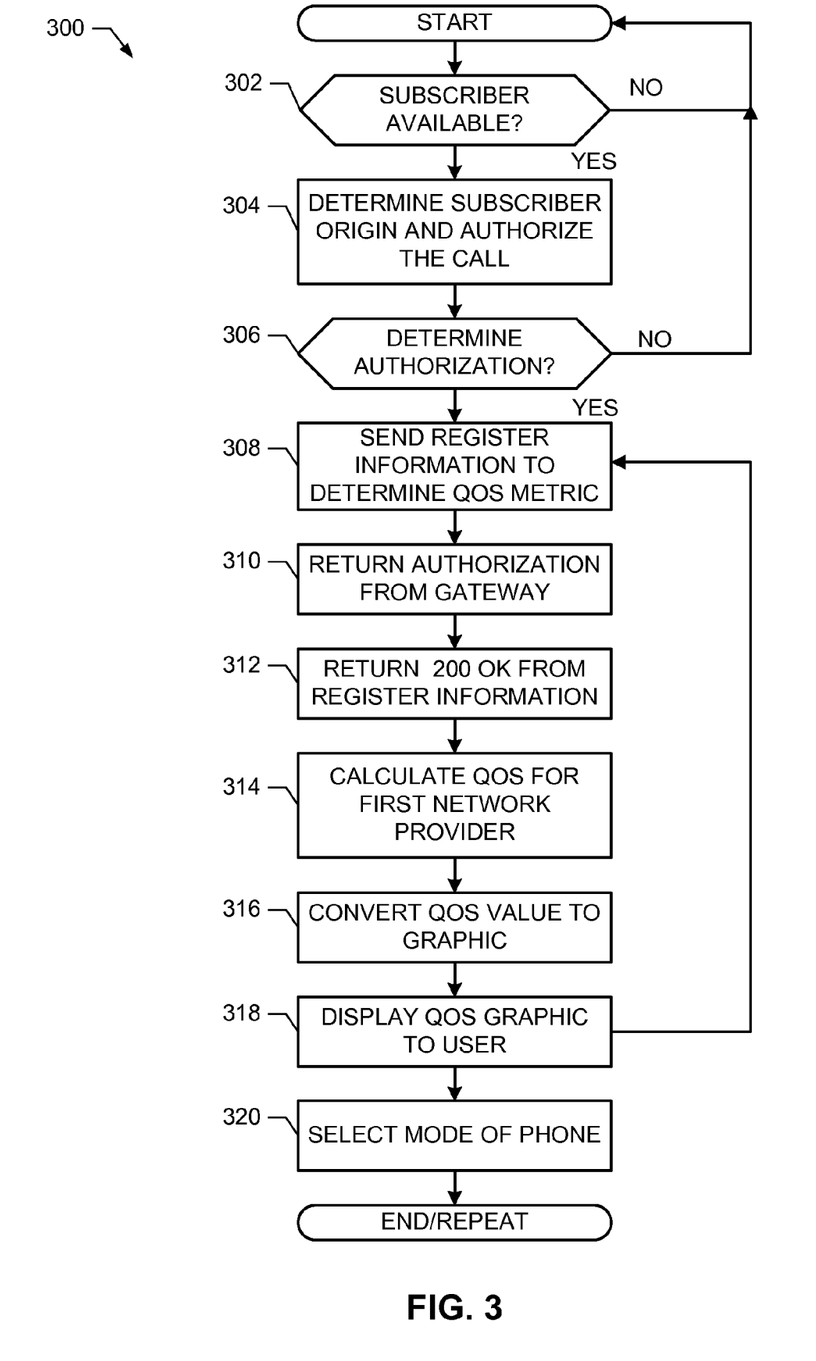
FIG. 3 is a flowchart representative of an example process that may be carried out to determine and display the quality of service for a communication network.

FIG. 3 is a flowchart representative of an example process that may be carried out to determine and display the quality of service for a communication network. The determination of a QoS initiates with a communication device waiting to receive notification that service is available on a provider's communication network (block 302). When a communication device is received on the network, the device or telephone number and other associated information stored in the database and are accessed to determine the origin on the communication network (block 304). Authorization may need to be reestablished if the communication device cycles power or has entered and/or left the service area. In the case of a VoIP device, this refers to the register information verifying the IP address of the device being connected to the LAN or WAN. If authorization has not been received, the communication device continues waiting for network availability (block 306). Only authorized calls will be permitted to transmit on the network.

Once the communication device has been authorized for a communication, the call is routed onto the communication network. A SIP register message containing the phone number or associated IP address for the call is sent through the communication network (block 308). An end point device associated with the first provider's communication network will receive the SIP register message and return a "200 OK response (block 310). The "200 OK" response is sent back though the network path to determine the QoS for the first provider's communication network (block 312).

Referring to FIG. 3, the characteristics of transmission can be determined for a communication network from the "200 OK" response from the register message (block 314). The received QoS metrics are compared to a time interval in which the "200 OK" responses expire. As long as the "200 OK" response has not expired the level of QoS will be displayed to the user. The network characteristics such as bandwidth, delay, information loss, availability, etc. are determined from the "200 OK" responses and are mapped to a corresponding QoS metric for a provider's communication network (block 316). The QoS metrics are configured as icons and displayed to a user via the communication device (block 318). The indication of the QoS icon will enable a user to select the mode of the communication device base upon the displayed QoS metric (block 320)—, further discussed in regards to FIG. 5.

The communication devices used in the example of FIG. 1 are configured with a screen (e.g., LCD, dot matrix, etc.) where the network availability and QoS icons will be displayed to the caller. The network availability and QoS metrics are converted into graphical icons, depicted in FIG. 4. The screen can graphically display an icon, such as, for example, lines, bars, colors, etc. The icons will represent the network availability metric 402 or the signal strength to the communication network and the QoS metric 404 or the representation of the SIP messages delivered across the communication provider's network. The QoS value is converted to an icon and displayed throughout the entire duration of the valid register "200 OK" response, therefore insuring a user has a clear understanding of the level of QoS from their service provider's network, as described above in connection with FIGS. 2 and 3. Once the QoS metric is displayed the user can select the mode in which to operate the communication device 406. The proper mode selection will be reflected from the representation of the QoS metric, and further discussed in regards to FIG. 5.

Figure 4:
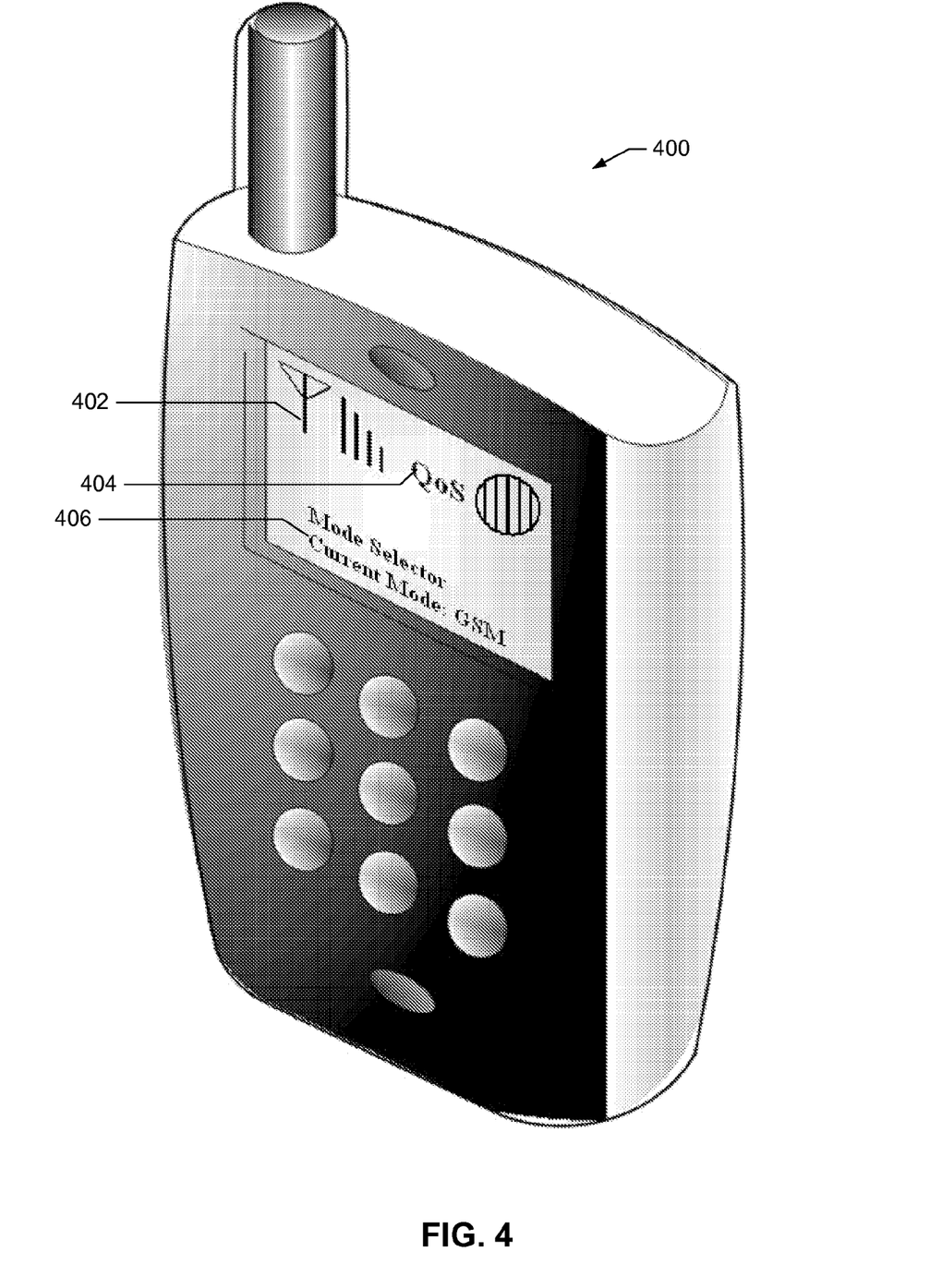
FIG. 4 is an example view of a VoIP communication device indicating network availability and quality of service.
Figure 5:
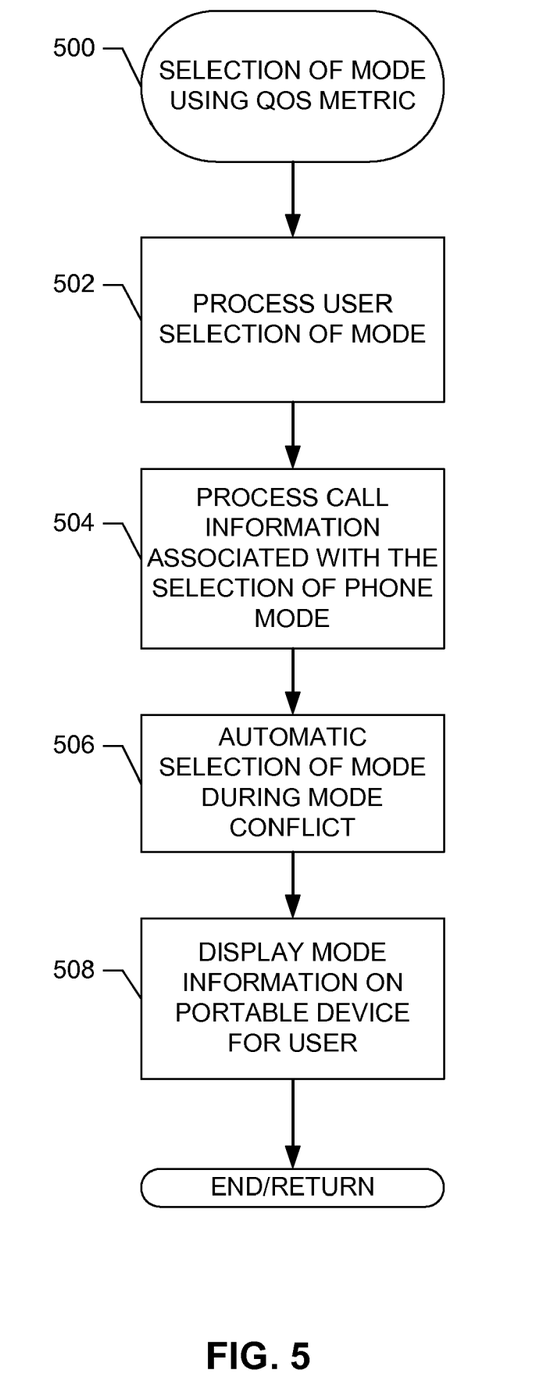
FIG. 5 is a flowchart representative of an example process to select the mode of a communication device once the QoS has been displayed.

FIG. 5 is a flowchart representative of an example process to select the mode of a communication for a device once the QoS has been displayed. As shown in FIG. 4, the displays of a QoS icon will allow the user to choose the mode (i.e., VoIP, GSM, CDMA, etc.) of communication. Referring to FIG. 5, the communication device may be configured, such that a user may be able to select a particular mode, or may enable an automatic selection process base upon the determined network QoS (block 502). Depending on the selected mode, the device may process the selection and switch to that mode of communication (block 504). The process also accounts for conflicts of multiple modes. For example, when a device is configured for a default GSM mode and a VoIP call is attempting to connect to the device, the device will automatically change the mode so that the incoming phone call can be received. During this time the display of the mode will be available to the user (block 508), and as shown in FIG. 4.

Figure 6:
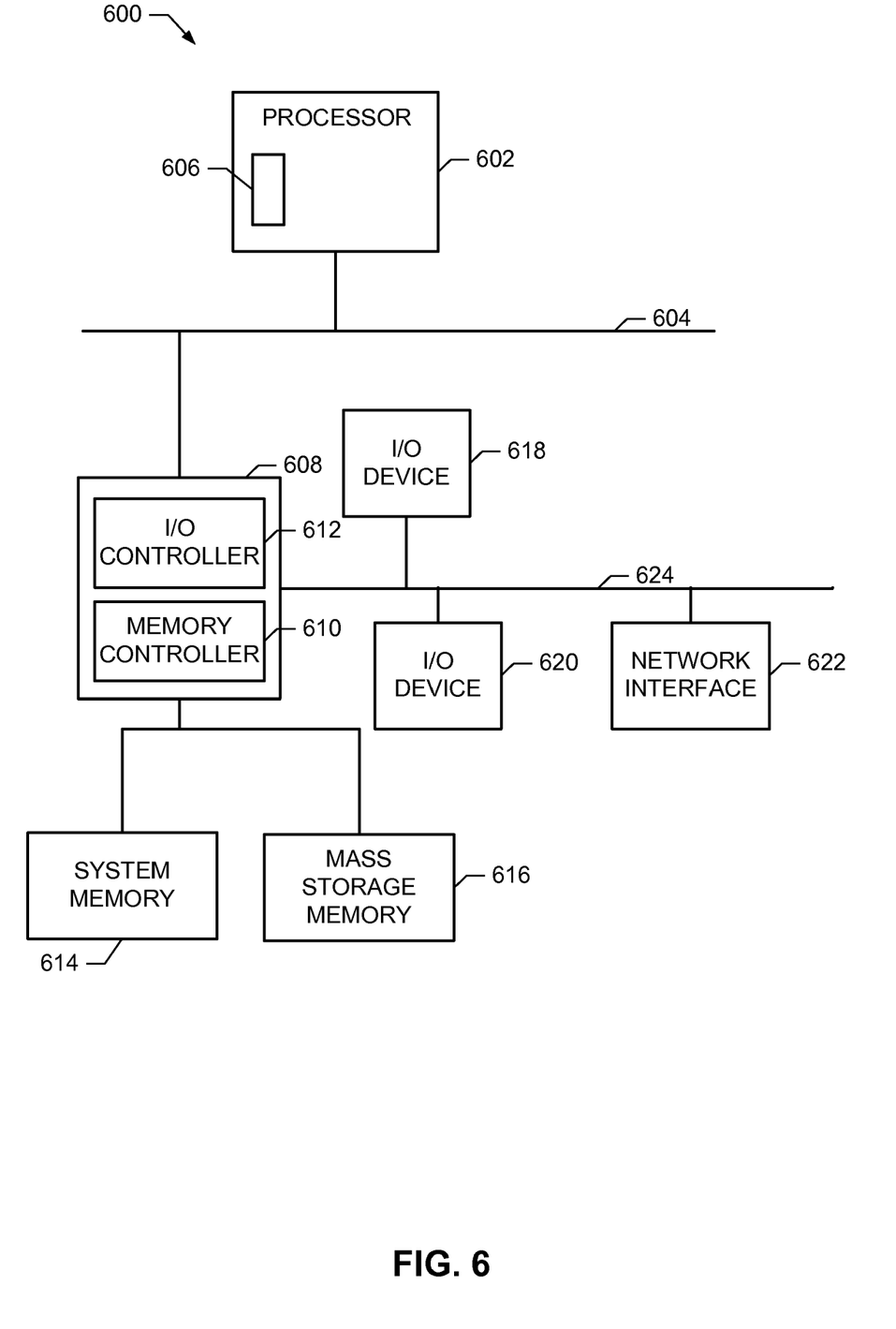
FIG. 6 is a block diagram of an example processor system that may be used to implement the example apparatus and methods described herein.

FIG. 6 is a block diagram of an example processor system 600 that may be used to implement the example apparatus and methods described herein. As shown in FIG. 6, the processor system 600 includes a processor 602 that is coupled to an interconnection bus 604. The processor 602 includes a register set or register space 606, which is depicted in FIG. 6 as being entirely on-chip, but which could alternatively be located entirely or partially off-chip and directly coupled to the processor 602 via dedicated electrical connections and/or via the interconnection bus 604. The processor 602 may be any suitable processor, processing unit or microprocessor. Although not shown in FIG. 6, the system 600 may be a multi-processor system and, thus, may include one or more additional processors that are identical or similar to the processor 602 and that are communicatively coupled to the interconnection bus 604.

The processor 602 of FIG. 6 is coupled to a chipset 608, which includes a memory controller 610 and an input/output (I/O) controller 612. As is well known, a chipset typically provides I/O and memory management functions as well as a plurality of general purpose and/or special purpose registers, timers, etc. that are accessible or used by one or more processors coupled to the chipset 608. The memory controller 610 performs functions that enable the processor 602 (or processors if there are multiple processors) to access a system memory 614 and a mass storage memory 616.

The system memory 614 may include any desired type of volatile and/or non-volatile memory such as, for example, static random access memory (SRAM), dynamic random access memory (DRAM), flash memory, read-only memory (ROM), etc. The mass storage memory 616 may include any desired type of mass storage device including hard disk drives, optical drives, tape storage devices, etc.

The I/O controller 612 performs functions that enable the processor 602 to communicate with peripheral input/output (I/O) devices 618 and 620 and a network interface 622 via an I/O bus 624. The I/O devices 618 and 620 may be any desired type of I/O device such as, for example, a keyboard, a video display or monitor, a mouse, etc. The network interface 622 may be, for example, an Ethernet device, an asynchronous transfer mode (ATM) device, an 802.11 device, a DSL modem, a cable modem, a cellular modem, etc. that enables the processor system 600 to communicate with another processor system.

While the memory controller 610 and the I/O controller 612 are depicted in FIG. 6 as separate functional blocks within the chipset 608, the functions performed by these blocks may be integrated within a single semiconductor circuit or may be implemented using two or more separate integrated circuits.

At least some of the above described example methods and/or apparatus are implemented by one or more software and/or firmware programs running on a computer processor. However, dedicated hardware implementations including, but not limited to, application specific integrated circuits, programmable logic arrays and other hardware devices can likewise be constructed to implement some or all of the example methods and/or apparatus described herein, either in whole or in part. Furthermore, alternative software implementations including, but not limited to, distributed processing or component/object distributed processing, parallel processing, or virtual machine processing can also be constructed to implement the example methods and/or apparatus described herein.

This patent contemplates examples wherein a device is associated with one or more machine readable mediums containing instructions, or receives and executes instructions from a propagated signal so that, for example, when connected to a network environment, the device can send or receive voice, video or data, and communicate over the network using the instructions. Such a device can be implemented by any electronic device that provides voice, video and/or data communication, such as a telephone, a cordless telephone, a mobile phone, a cellular telephone, a Personal Digital Assistant (PDA), a set-top box, a computer, and/or a server.

Additionally, although this patent discloses example software or firmware executed on hardware and/or stored in a memory, it should be noted that such software or firmware is merely illustrative and should not be considered as limiting. For example, it is contemplated that any or all of these hardware and software components could be embodied exclusively in hardware, exclusively in software, exclusively in firmware or in some combination of hardware, firmware and/ or software. Accordingly, while the above specification described example methods and articles of manufacture, persons of ordinary skill in the art will readily appreciate that the examples are not the only way to implement such methods and articles of manufacture. Therefore, although certain example methods, apparatus and articles of manufacture have been described herein, the scope of coverage of this patent is not limited thereto. On the contrary, this patent covers all methods, apparatus and articles of manufacture fairly falling within the scope of the appended claims either literally or under the doctrine of equivalents.

What is claimed is:

1. A method comprising:
    measuring, at a communication device, a quality of service metric from a call registration response message for a call routed through a first communication provider to a second communication provider, wherein the quality of service metric represents a measured service quality only through the first communication provider for the call; and
    displaying a representation of the quality of service metric for the first communication provider to a user at the communication device.

2. The method as defined in claim 1, further comprising a mode selector to change a mode of communication for a multiple mode communication device once the quality of service metric for the first communication provider is displayed to the user.

3. The method as defined in claim 2, wherein the communication device can be communicate as a Voice over Internet Protocol, Global System for Mobile Communication, or a combination of modes as enabled by a device to support multiple modes.

4. The method as defined in claim 1, wherein a global quality of service metric exists for a communication network comprising a plurality of network providers.

5. The method as defined in claim 1, wherein the quality of service metric is representative of call quality for a first communication network of the first communication provider network for the call routed though the plurality of network providers.

6. The method as defined in claim 1, wherein the quality of service metric represents the call quality of a multi-network environment of the first communication provider.

7. The method as defined in claim 6, wherein the multi-network environment comprises one or more of a public-switch telephone network, a Voice over Internet Protocol network, or a Global System for Mobile Communication network.

8. The method as defined in claim 1, wherein displaying the representation comprises displaying a graphical indication of the communication network of the first communication provider service quality to the user.

9. The method as defined in claim 1, wherein measuring the quality of service metric comprises performing a real-time determination of the call quality from a SIP response message sent through the network of the first communication provider.

10. The method as defined in claim 1, wherein the quality of service metric represents at least one of network availability, bandwidth, or time delay of a first network of the first communication provider.

11. The method as defined in claim 10, wherein displaying the representation comprises displaying a graphical representation of the quality of service metric.

12. The method as defined in claim 11, wherein the graphical representation of the quality of service metric is displayed as an icon on the communication device.

13. The method as defined in claim 1, further comprising removing the representation of the quality of service metric when the call registration response message expires.

14. An apparatus comprising:
    a quality of service calculator to measure a quality of service metric from a call registration response message for a call routed through a first communication provider to a second communication provider, the quality of service metric to represent a measured call quality only through the first communication provider for the call; and
    a quality of service displayer to display the quality of service metric for the first communication provider to a user, at least one of the quality of service calculator or the quality of service displayer being implemented using a processor.

15. The apparatus as defined in claim 14, further comprising a switch to select a mode of communication based on the quality of service metric.

16. The apparatus as defined in claim 15, wherein the switch is to select the mode based on a mode chosen by the user or to select the mode associated with the quality of service metric for the first communication provider.

17. The apparatus as defined in claim 16, wherein the quality of service calculator is to convert the quality of service metric to a graphical representation for display.

18. A tangible machine readable storage medium comprising machine accessible instructions which, when executed, cause a machine to at least:
   measure a quality of service metric from a call registration response message for a call routed through a first communication provider to a second communication provider, the quality of service metric to represent a measured service quality only through the first communication provider for the call; and
   display a graphical representation on a communication device for the quality of service metric of the first communication provider.

19. The machine readable storage medium as defined in claim 18, wherein the instructions further change a mode of communication of the communication device when the quality of service metric has been established.

20. The machine readable storage medium as defined in claim 18, wherein the machine accessible instructions, when executed, further cause the communication device to display the quality of service metric to the user, wherein the call may route to a plurality of provider networks.

21. The machine readable storage medium as defined in claim 18, wherein the machine accessible instructions, when executed, further cause the machine to convert the quality of service metric to the graphical representation.

22. The machine readable storage medium as defined in claim 18, wherein the machine accessible instructions, when executed, further cause the machine to select a mode of communication for the communication device as determined from the quality of service metric.

23. The machine readable storage medium as defined in claim 18, wherein the machine accessible instructions, when executed, further cause the machine to remove the representation of the quality of service metric when the call registration response message expires.

* * * * *